United States Patent [19]

Wittman et al.

[11] Patent Number: 5,484,846

[45] Date of Patent: Jan. 16, 1996

[54] POWDER MIXTURES FOR MATT POLYCARBONATE MOLDING COMPOUNDS

[75] Inventors: Dieter Wittman, Colonge; Jochen Schoeps, Krefeld; Horst Beicher, Tönisvorst; Karl-Erwin Piejko, Bergisch Gladbach; Kurt Weirauch, Bergisch Gladbach, all of Germany

[73] Assignee: Bayer AG, Leverkusen, Germany

[21] Appl. No.: 349,451

[22] Filed: Nov. 30, 1994

Related U.S. Application Data

[63] Continuation of Ser. No. 111,862, Aug. 26, 1993, abandoned.

[30] Foreign Application Priority Data

Sep. 4, 1992 [DE] Germany .................. 42 29 642.0

[51] Int. Cl.$^6$ ................................ C08L 69/00
[52] U.S. Cl. .................. 525/67; 525/133; 525/146; 525/148
[58] Field of Search ............... 525/67, 101, 133, 525/146, 148

[56] References Cited

U.S. PATENT DOCUMENTS

| | | | |
|---|---|---|---|
| 3,130,177 | 4/1964 | Grabowski | 260/45.5 |
| 3,873,641 | 3/1975 | Margotte | 525/148 |
| 4,267,096 | 5/1981 | Bussink | 525/67 |
| 4,624,986 | 11/1986 | Weber et al. | 525/67 |
| 4,628,074 | 12/1986 | Boutni | 525/146 |
| 4,677,162 | 6/1987 | Grigo et al. | 525/67 |
| 4,740,553 | 4/1988 | Maeda | 525/67 |
| 5,162,423 | 11/1992 | Neumann et al. | 524/504 |

FOREIGN PATENT DOCUMENTS

| | | |
|---|---|---|
| 0429957 | 6/1991 | European Pat. Off. |
| 1170141 | 5/1964 | Germany |
| 3640582 | 6/1988 | Germany |

*Primary Examiner*—David Buttner
*Attorney, Agent, or Firm*—Connolly & Hutz

[57] ABSTRACT

Thermoplastic molding compounds containing

A. 10 to 99 parts by weight polycarbonate or polyester carbonate

B. 0 to 90 parts by weight of a rubber-free resin compatible or partly compatible with component A., C. 0 to 90 parts by weight of a rubber-modified resin compatible or partly compatible with component A., D. 0.5 to 10 parts by weight, based on 100 parts by weight of A+B+C, of a rubber component having a glass transition temperature below 0° C. which is incompatible with component A, characterized in that component D is used in the form of a powder mixture D* produced from a. 1 to 50 parts by weight of an ungrafted particulate rubber component having a glass transition temperature below 0° C. and an average particle diameter $d_{50}$ of 0.05 to 5 μm in latex form and b. 50 to 99 parts by weight of component B, component C or a mixture of components B and C in latex form, the components mentioned under a. and b. initially being mixed with one another as latices and then being worked up together to form a powder mixture D*.

16 Claims, No Drawings

POWDER MIXTURES FOR MATT POLYCARBONATE MOLDING COMPOUNDS

This application is a continuation of application Ser. No. 08/111,862 filed on Aug. 26, 1993, which is now abandoned.

Many rubber polymers, such as polybutadiene for example, are incompatible with polycarbonates. ABS graft polymers partly compatible with the polycarbonate are obtained by graft polymerization of certain monomers, for example styrene/acrylonitrile mixtures, onto polybutadiene rubbers.

Thermoplastic molding compounds of polycarbonates and ABS polymers have long been known. Thus, DE-A 1 170 141, for example, describes the good processability of molding compounds of polycarbonates and graft polymers of monomer mixtures of acrylonitrile and an aromatic vinyl hydrocarbon on polybutadiene (emulsion ABS).

According to U.S. Pat. No. 4,624,986, molding compounds of ABS polymers produced by bulk or bulk/suspension polymerization and polycarbonates have improved low-temperature properties and reduced gloss.

U.S. Pat. No. 4,677,162 emphasizes the high toughness and reduced gloss of mixtures of polycarbonates, bulk ABS polymers and emulsion ABS graft polymers.

Polycarbonate molding compounds based on graft polymers produced by emulsion polymerization generally have a high-gloss surface which is desirable for many applications (such as telephone housings or parts of toys). However, in some fields of application (motor vehicle interiors), there is also an increasing need— in the case of unlacquered parts— for material which leads to moldings having a matt surface. Although these requirements are partly satisfied by polycarbonate blends based on bulk ABS (see above), the stress cracking behavior of these blends (with respect to simulated fuel representative of many chemicals which can come into contact with unlacquered and hence unprotected surfaces) is inadequate.

It has surprisingly been found that polycarbonate molding compounds containing special powder mixtures, for example of graft polymers on rubber and rubber polymers, can be processed by injection molding or extrusion to moldings having a matt surface which show favorable stress cracking behavior with respect to simulated fuels, such as for example toluene/isooctane.

The special powder compositions are mixtures of polymers and ungrafted rubbers in certain ratios which are obtained in the form of powders by mixing the corresponding latices, co-precipitating the resulting mixed latex and drying.

Despite of use of ungrafted rubbers, there is unexpectedly no reduction in notched impact strength.

Accordingly, the present invention relates to thermoplastic molding compounds containing A. 10 to 99 and preferably 20 to 90 parts by weight polycarbonate or polyester carbonate B. 0 to 90 and preferably 5 to 80 parts by weight of a rubber-free resin compatible or partly compatible with component A., C. 0 to 90 and preferably 5 to 80 parts by weight of a rubber-modified resin compatible or partly compatible with component A., D. 0.5 to 10 parts by weight, preferably 1 to 7.5 parts by weight and more preferably 1.5 to 5 parts by weight, based on 100 parts by weight of A+B+C, of a rubber component having a glass transition temperature below 0° C. which is incompatible with component A, characterized in that component D is used in the form of a powder mixture D* produced from a. 1 to 50 and preferably 2 to 30 parts by weight of an ungrafted particulate rubber component having a glass transition temperature below 0° C. and an average particle diameter $d_{50}$ of 0.05 to 5 μm in latex form and b. 50 to 99 and preferably 70 to 98 parts by weight of component B, component C or a mixture of components B and C in latex form, the components mentioned under a. and b. initially being mixed with one another as latices and then being worked up together to form a powder mixture D, and the total content of the quantities of rubber component D introduced into molding compounds through D*, based on 100 parts by weight (A+B+C), having to be between 0.5 and 10 parts by weight and the total content of B, C or a mixture of B and C, including the quantities introduced into the molding compounds through D*, not exceeding 90 parts by weight, based on 100 parts by weight (A+B+C).

Component A

Aromatic polycarbonates and/or aromatic polyester carbonates for component A are known from the literature or may be produced by methods known from the literature (for the production of aromatic polycarbonates, see for example Schnell, "Chemistry and Physics of Polycarbonates", Interscience Publishers, 1964, and DE-AS 1 495 626, DE-OS 2 232 877, DE-OS 2 703 376, DE-OS 2 714 544, DE-OS 3 000 610, DE-OS 3 832 396; for the production of aromatic polyester carbonates, see for example DE-OS 3 007 934).

Aromatic polycarbonates and/or aromatic polyester carbonates are produced, for example, by reaction of diphenols with carbonic acid halides, preferably phosgene, and/or with aromatic dicarboxylic acid dihalides, preferably benzene dicarboxylic acid dihalides, by the interfacial process, optionally using chain terminators, for example monophenols, and optionally using trifunctional or more than trifunctional branching agents, for example triphenols or tetraphenols.

Diphenols for the production of the aromatic polycarbonates and/or aromatic polyester carbonates are preferably those corresponding to formula (I)

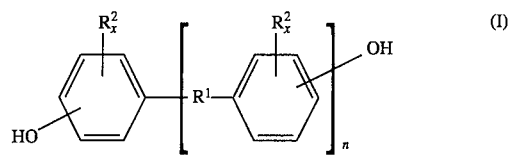

in which
$R^1$ is a single bond, a $C_{1-5}$ alkylene, $C_{2-5}$ alkylidene, $C_{5-6}$ cycloalkylidene, —O—, —SO—,

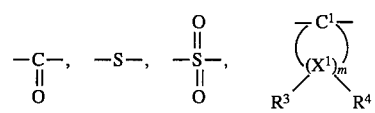

or a group corresponding to formula (II)

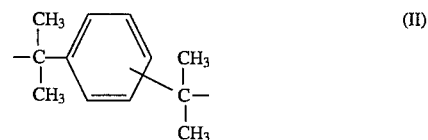

$R^2$ is chlorine or bromine, x=0, 1 or 2, n=1 or 0 and $R^3$ and $R^4$ may be individually selected for each $X^1$ and, independently of one another, represent hydrogen or $C_{1-6}$ alkyl, $X^1$ is carbon and m is an integer of 4 to 7, preferably 4 or 5.

Accordingly, preferred diphenols are hydroquinone, resorcinol, dihydroxydiphenols, bis-(hydroxyphenyl)-$C_{1-5}$-alkanes, bis-(hydroxyphenyl)-$C_{5-6}$-cycloalkanes, bis-(hydroxyphenyl)-ethers, bis-(hydroxyphenyl)-sulfoxides, bis-(hydroxyphenyl)-ketones, bis-(hydroxyphenyl)-sulfones, α,α-bis-(hydroxyphenyl)diisopropyl benzenes and nucleus-brominated and/or nucleus-chlorinated derivatives thereof.

Particularly preferred diphenols are bisphenol A, 2,4-bis-(4-hydroxyphenyl)-2-methyl butane, 1,1-bis-(4 -hydroxyphenyl)-cyclohexane, 1,1-bis-(4-hydroxyphenyl)- 3,3,5-trimethyl cyclohexane, 4,4'-dihydroxydiphenyl sulfide, 4,4'-dihydroxydiphenyl sulfone and di- and tetrabrominated or chlorinated derivatives thereof, such as for example 2,2-bis-(3-chloro-4-hydroxyphenyl)propane, 2,2-bis-(3,5-dichloro-4-hydroxyphenyl)-propane or 2,2-bis-(3,5-dibromo-4-hydroxyphenyl)-propane 2,2-Bis-(4-hydroxyphenyl)-propane (bisphenol A) is particularly preferred.

The diphenols may be used individually or in admixture with one another.

The diphenols are known from the literature or may be obtained by methods known from the literature.

Chain terminators suitable for the production of the thermoplastic aromatic polycarbonates are, for example, phenol, p-chlorophenol, p-tert.butyl phenol or 2,4,6-tribromophenol and long-chain alkyl phenols, such as 4-(1,3-tetramethylbutyl)-phenol according to DE-OS 2 842 005 or monoalkyl phenol or dialkyl phenols containing a total of 8 to 20 carbon atoms in the alkyl substituents, such as 3,5-di-tert.butyl phenol, p-isooctyl phenol, p-tert.octyl phenol, p-dodecyl phenol and 2-( 3,5-dimethylheptyl)-phenol and 4-(3,5-dimethylheptyl)phenol. The quantity of chain terminators to be used is generally between 0 5 mol-% and 10 mol-%, based on the total mols of diphenols used.

The thermoplastic aromatic polycarbonates have average weight average molecular weights ($\overline{M}_w$, as measured for example by ultracentrifugation or scattered light measurement) in the range from 10,000 to 200,000 and preferably in the range from 20,000 to 80,000.

The thermoplastic aromatic polycarbonates may be branched in known manner, preferably by the incorporation of 0.05 to 2.0 mol-%, based on the total mols of diphenols used, of trifunctional or more than trifunctional compounds, for example those containing three or more than three phenolic groups.

Both homopolycarbonates and copolycarbonates are suitable. 1 to 25% by weight and preferably 2 to 25% by weight (based on the total quantity of diphenols to be used) of diphenols corresponding to formula (III)

n=1 or 0, the $R^5$'s may be the same or different and represent a linear $C_{1-20}$ alkyl, branched $C_{3-20}$ alkyl or $C_{6-20}$ aryl, preferably $CH_3$, and p is an integer of 5 to 100 and preferably 20 to 80, may also be used for the production of copolycarbonates A) according to the invention.

Hydroxyaryloxy-terminated polydiorganosiloxanes corresponding to formula (III) are known (see for example U.S. Pat. No. 3,419,634) or may be produced by methods known from the literature. The production of polydiorganosiloxane-containing copolycarbonates is described, for example, in DE-OS 3 334 782.

In addition to bisphenol A homopolycarbonates, preferred polycarbonates are the copolycarbonates of bisphenol A with up to 15 mol-%, based on the total mols of diphenols, of the other preferred or particularly preferred diphenols mentioned, more particularly 2,2-bis-( 3,5-dibromo-4-hydroxyphenyl)-propane.

Aromatic dicarboxylic acid dihalides for the production of the thermoplastic aromatic polyester carbonates are, preferably, the diacid dichlorides of isophthalic acid, terephthalic acid, diphenylether-4,4'-dicarboxylic acid and naphthalene-2,6-dicarboxylic acid.

Mixtures of the diacid dichlorides of isophthalic acid and terephthalic acid in a ratio of 1:20 to 20:1 are particularly preferred.

A carbonic acid halide, preferably phosgene, is additionally used as a bifunctional acid derivative in the production of polyester carbonates.

In addition to the monophenols already mentioned, suitable chain terminators for the production of the aromatic polyester carbonates include chlorocarbonic acid esters of those monophenols and the acid chlorides of aromatic monocarboxylic acids, which may optionally be substituted by $C_{1-22}$ alkyl groups or by halogen atoms, and aliphatic $C_{2-22}$ monocarboxylic acid chlorides.

The quantity of chain terminators is between 0.1 and 10 mol-%, based on mols of diphenols in the case of the phenolic chain terminators and on mols of dicarboxylic acid chlorides in the case of monocarboxylic acid chloride chain terminators.

The aromatic polyester carbonates may also contain incorporated aromatic hydroxycarboxylic acids.

The aromatic polyester carbonates may be both linear and branched in known manner. (See also DE-OS 2 940 024 and DE-OS 3 007 934.)

Suitable branching agents are, for example, trifunctional or more than trifunctional carboxylic acid chlorides, such as trimesic acid trichloride, cyanuric acid trichloride, 3,3',4,4'-benzophenone tetracarboxylic acid tetrachloride, 1,4,5,8-naphthalene tetracarboxylic acid tetrachloride or pyromellitic acid tetrachloride, used in quantities of 0.01 to 1.0 mol-% (based on dicarboxylic acid dichlorides used) or trifunctional or more than trifunctional phenols, such as phloroglucinol, 4,6-dimethyl-2,4,6-tri-(4-hydroxyphenyl)-hept-2-ene, 4,6-dimethyl-2,4,6-tri-(4-hydroxyphenyl)-hep-

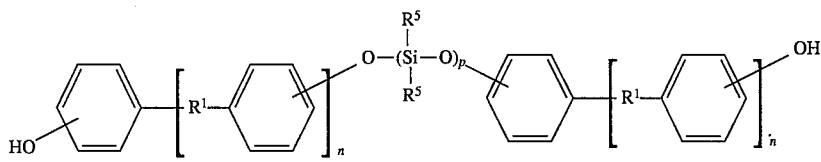

(III)

in which $R^1$ is as defined above for formula (I), tane, 1,3,5 -tri-(4-hydroxyphenyl)-benzene, 1,1-tri-(4-hydroxyphenyl)-ethane, tri-(4-hydroxyphenyl)-phenyl methane, 2,2-bis-[ 4,4-bis-(4-hydroxyphenyl)-cyclohexyl]-propane, 2,4-bis-( 4-hydroxyphenylisopropyl)-phenol, tetra-(4-hydroxyphenyl)-methane, 2,6-bis-(2-hydroxy-5-methyl-benzyl)-4-methyl phenol, 2-(4-hydroxyphenyl)-2-(2,4-dihydroxyphenyl)-propane, tetra-(4-[4-hydroxyphenylisopropyl]phenoxy)-methane, 1,4-bis-[4,4"-dihydroxytriphenyl)methyl] -benzene, used in quantities of 0.01 to 1.0 mol-% (based on diphenols used). Phenolic branching agents may be initially introduced with the diphenols while acid chloride branching agents may be introduced together with the acid dichlorides.

The percentage content of carbonate structural units may be varied as required in the thermoplastic aromatic polycarbonates.

The percentage content of carbonate groups is preferably up to 100 mol-%, more preferably up to 80 mol-% and, most preferably, up to 50 mol-%, based on the total of ester groups and carbonate groups.

Both the ester component and the carbonate component of the aromatic polyester carbonates may be present in the polycondensate in the form of blocks or in statistical distribution.

The relative solution viscosity ($\eta_{rel}$) of the aromatic polyester carbonates is in the region of 1.18 to 1.4 and preferably in the region of 1.22 to 1.3 (as measured on solutions of 0.5 g polyester carbonate in 100 ml $CH_2Cl_2$ solution at 25° C.).

The thermoplastic aromatic polycarbonates and polyester carbonates may be used individually or in admixture with one another.

Component B

Suitable components B. are (co)polymers, polyalkylene terephthalates or mixtures thereof.

(Co)polymers of at least one monomer from the group of aromatic vinyl compounds, vinyl cyanides (unsaturated nitriles), ($C_{1-8}$) (meth)acrylates, unsaturated carboxylic acids and derivatives (such as anhydrides and imides) of unsaturated carboxylic acids are suitable. (Co)polymers of B.1 50 to 99 and preferably 60 to 95 parts by weight aromatic vinyl compounds, nucleus-substituted aromatic vinyl compounds (such as, for example, styrene, e-methyl styrene, p-methyl styrene, p-chlorostyrene), ($C_{1-4}$) alkyl methacrylates (for example methyl methacrylate, ethyl methacrylate) or mixtures thereof and B.2 1 to 50 and preferably 5 to 40 parts by weight vinyl cyanides (unsaturated nitriles, such as acrylonitrile and methacrylonitrile), ($C_{1-8}$) alkyl (meth)acrylates (for example methyl methacrylate, n-butyl acrylate, t-butyl acrylate), unsaturated carboxylic acids (such as maleic acid), derivatives (such as anhydrides and imides) of unsaturated carboxylic acids (for example maleic anhydride and N-phenyl maleic imide) or mixtures thereof, are particularly suitable.

The (co)polymers B. are resin-like, thermoplastic and rubber-free.

The copolymer of B.1 styrene and B.2 acrylonitrile is particularly preferred.

Copolymers of component B. are often formed as secondary products in the graft polymerization of component C., particularly when large quantities of monomers C.1 are grafted onto small quantities of rubber C.2.

The quantity of B. to be used in accordance with the invention does not include these secondary products of the graft polymerization of C.

The (co)polymers of component B. are known and may be prepared by radical polymerization, more particularly by emulsion, suspension, solution or bulk polymerization. The (co)polymers of component B. generally have molecular weights $\overline{M}_w$ (weight average, as determined by light scattering or sedimentation) in the range from 15,000 to 200,000 and preferably in the range from 30,000 to 175,000.

Polyalkylene terephthalates suitable as component B. are reaction products of aromatic dicarboxylic acids (or reactive derivatives thereof, for example dimethyl esters or anhydrides) and aliphatic, cycloaliphatic or aryl aliphatic diols and mixtures of such reaction products.

Preferred polyalkylene terephthalates may be prepared by known methods from terephthalic acids (or reactive derivatives thereof) and aliphatic and cycloaliphatic diols containing 2 to 10 carbon atoms (Kunst-stoff-Handbuch, Vol. VIII, pages 695 et seq., Carl Hanser Verlag, München 1973).

Preferred polyalkylene terephthalates contain 80 to 100 mol-% and preferably 90 to 100 mol-%, based on the dicarboxylic acid component, of terephthalic acid units and 80 to 100 mol-% and preferably 90 to 100 mol-%, based on the diol component, of ethylene glycol and/or butane-1,4-diol units. In addition to terephthalic acid units, 0 to 20 mol-% units of other aromatic dicarboxylic acids containing 8 to 14 carbon atoms or aliphatic dicarboxylic acids containing 4 to 12 carbon atoms, such as units of phthalic acid, isophthalic acid, 2,6-naphthalene dicarboxylic acid, 4,4'-diphenyl dicarboxylic acid, succinic acid, adipic acid, sebacic acid, azelaic acid or cyclohexane diacetic acid, are also present. In addition to ethylene glycol and/or butane-1,4-diol units, 0 to 20 mol-% of other aliphatic diols containing 3 to 12 carbon atoms or cycloaliphatic diols containing 6 to 12 carbon atoms., for example units of pentane-1,5-diol, hexane-1,6-diol, cyclohexane-1,4-dimethanol, 3-methylpentane-1,3- and -1,6-diol, 2-ethylhexane- 1,3-diol, 2,2-diethylpropane-1,3-diol, hexane-2,5-diol, 1,4-di-(5-hydroxyethoxyphenyl)-propane, 2,4-dihydroxy-1,1,3,3-tetramethyl cyclobutane, 2,2-bis-( 3-β-hydroxyethoxyphenyl)-propane and 2,2-bis-(4-hydroxypropoxyphenyl)-propane (DE-OS 2 407 647, 2 407 776, 2 715 932), are also present.

The polyalkylene terephthalates may be branched by incorporation of relatively small quantities of 3- or 4-hydric alcohols or 3- or 4-basic carboxylic acids as described in DE-A 1 900 270 and U.S. Pat. No. 3,692,744. Examples of preferred branching agents are trimesic acid, trimellitic acid, trimethylol ethane and propane and pentaerythritol. It is advisable to use no more than 1 mol-% of the branching agent, based on the acid component.

Polyalkylene terephthalates which have been produced solely from terephthalic acid (or reactive derivatives thereof, for example dialkyl esters) and ethanediol and/or butane-1, 4-diol and also mixtures thereof are particularly preferred.

Other preferred polyalkylene terephthalates are copolyesters produced from at least two of the diols mentioned above; particularly preferred copolyesters are poly-(ethylene glycol/butane-1,4-diol)-terephthalates. The various diol units may be present in the copolyesters in the form of blocks or in statistical distribution.

The polyalkylene terephthalates of component B. generally have an intrinsic viscosity of 0.4 to 1.5 dl/g, preferably 0.5 to 1.3 dl/g and, more preferably, 0.6 to 1.2 dl/g, as measured in phenol/o-dichlorobenzene (1:1 parts by weight) at 25° C.

Component C

Components C according to the invention are graft copolymers of

C.1 10 to 95 parts by weight monomers on

C.2 5 to 90 parts by weight rubber-elastic bases.

Monomers C.1 are preferably mixtures from the group

C.1.1 50 to 99 and preferably 60 to 95 parts by weight aromatic vinyl compounds nucleus-substituted aromatic vinyl compounds (for example styrene, α-methyl styrene, p-methyl styrene, p-chlorostyrene) $C_{1-4}$ alkyl methacrylates (for example methyl methacrylate, ethyl methacrylate ) or mixtures thereof and from the group C.1.2 1 to 50 and preferably 5 to 40 parts by weight vinyl cyanides (unsaturated nitriles, such as for example acrylonitrile and methacrylonitrile), $(C_{1-8})$ alkyl methacrylates (for example methyl methacrylate, n-butyl acrylate, t-butyl acrylate), unsaturated carboxylic acids (such as maleic acid), derivatives (such as anhydrides and imides) of unsaturated carboxylic acids ( for example maleic anhydride and N-phenyl maleic imide) or mixtures thereof.

Particularly preferred monomers C.1.1 are styrene, α-methyl styrene and methyl methacrylate; particularly preferred monomers C.1.2 are acrylonitrile, maleic anhydride and methyl methacrylate.

C1.1 styrene and C.1.2 acrylonitrile are particularly preferred.

Rubbers C.2. suitable for the rubber-modified graft polymers C. are, for example, diene rubbers, EP(D)M rubbers, i.e. those based on ethylene/propylene, and optionally diene, acrylate, polyurethane, silicone, chloroprene and ethylene/vinyl acetate rubbers.

Preferred rubbers C.2. are diene rubbers (for example based on butadiene, isoprene, etc.) or mixtures of diene rubbers or copolymers of diene rubbers or mixtures thereof with other copolymerizable monomers (for example according to C.1.1 and C.1.2), with the proviso that the glass transition temperature of component C.2 is below 0° C.

Pure polybutadiene rubber is particularly preferred.

Particularly preferred polymers C. are, for example, ABS polymers (emulsion, bulk and suspension ABS), as described for example in DE-OS 2 035 390 (=U.S. Pat. No. 3,644,574) or in DE-OS 2 248 242 (=GB-PS 1,409,275) and in Ullmann, Enzyklopädie der Technischen Chemie, Vol. 19 (1980), pages 280 et seq.

The gel content of the graft base C.2 in the graft polymer after grafting is at least 50% by weight (as measured in toluene) while the average particle diameter $d_{50}$ of the graft polymer C is 0.05 to 5 μm and preferably 0.075 to 0.6 μm.

The average particle diameter $d_{50}$ is the diameter above which 50% by weight of the particles and below which 50% by weight of the particles lie. It can be determined by ultracentrifuge measurement (W. Scholtan, H. Lange, Kolloid Z. und Z. Polymere 250 (1972), 782– 796).

The graft copolymers C. are produced by radical polymerization, for example by emulsion, suspension, solution or bulk polymerization, preferably by emulsion polymerization.

Since the graft monomers are not necessarily grafted completely onto the graft base in the grafting reaction, graft polymers C. in the context of the invention also include products which are obtained by polymerization of the graft monomers in the presence of the graft base.

Suitable acrylate rubbers C.2. of the polymers C. are preferably polymers of alkyl acrylates, optionally with up to 40% by weight, based on C.2, of other polymerizable ethylenically unsaturated monomers. Preferred polymerizable acrylates are $C_{1-8}$ alkyl acrylates, for example methyl, ethyl, butyl, n-octyl and 2-ethylhexyl acrylate; haloalkyl esters, preferably halo-$C_{1-8}$-alkyl esters, such as chloroethyl acrylate, and mixtures of these monomers.

Monomers containing more than one polymerizable double bond may be copolymerized for crosslinking. Preferred examples of crosslinking monomers are esters of unsaturated monocarboxylic acids containing 3 to 8 carbon atoms and unsaturated monohydric alcohols containing 3 to 12 carbon atoms or saturated polyols containing 2 to 4 OH groups and 2 to 20 carbon atoms, such as for example ethylene glycol dimethacrylate, allyl methacrylate; polyunsaturated heterocyclic compounds, such as for example trivinyl and triallyl cyanurate; polyfunctional vinyl compounds, such as divinyl and trivinyl benzenes; and also triallyl phosphate and diallyl phthalate.

Preferred crosslinking monomers are allyl methacrylate, ethylene glycol dimethacrylate, diallyl phthalate and heterocyclic compounds containing at least 3 ethylenically unsaturated groups.

Particularly preferred crosslinking monomers are the cyclic monomers triallyl cyanurate, triallyl isocyanurate, trivinyl cyanurate, triacryloyl hexahydro-striazine, triallyl benzenes.

The quantity in which the crosslinking monomers are used is preferably between 0.02 and 5% by weight and, more preferably, between 0.05 and 2% by weight, based on the graft base C.2.

In the case of cyclic crosslinking monomers containing at least 3 ethylenically unsaturated groups, it is of advantage to limit the quantity to below 1% by weight of the graft base C.2. Preferred "other" polymerizable ethylenically unsaturated monomers, which may optionally be used in addition to the acrylates for the production of the graft base C.2, are for example acrylonitrile, styrene, s-methyl styrene, acrylamides, vinyl-$C_{1-6}$-alkyl ethers, methyl methacrylate, butadiene. Preferred acrylate rubbers as the graft C.2 are emulsion polymers having a gel content of at least 60% by weight.

Other suitable graft bases C.2 are silicone rubbers containing graft-active sites, as described in DE-OS 3 704 657, DE-OS 3 704 655, DE-OS 3 631 540 and DE-OS 3 631 539.

The gel content of the graft base C.2 is determined in a suitable solvent at 25° C. (M. Hoffmann, H. Krömer, R. Kuhn, Polymeranalytik I und II, Georg Thieme-Verlag, Stuttgart 1977).

Component D

Component D. is an ungrafted rubber having a glass temperature below 0° C. which is substantially incompatible with A. Incompatible in the context of the invention means that the mixed product obtained by mixing of D. into the melt of A. (at temperatures in the range at which A. is normally processed—generally 200 to 350° C.—and with the usual compounding units) does not show a significant reduction in the glass transition temperature (Tg) in A. or an increase in the Tg in D.

Suitable rubber components D. (corresponds to a)) are any of the products mentioned under C.2 providing they are incompatible with A., i.e. for example diene rubbers, EP(D)M rubbers (i.e. those based on ethylene/propylene and optionally diene), acrylate, polyurethane, silicone, chloroprene and ethylene/vinyl acetate rubbers, which are obtainable in the form of fine-particle suspensions or latices having particle diameters $d_{50}$ of 0.05 to 5 μm and which have a glass transition temperature below 0° C.

Preferred rubbers D. are diene rubbers (for example based on butadiene, isoprene, etc.) or mixtures of diene rubbers or copolymers of diene rubbers or mixtures thereof with other copolymerizable monomers (for example styrene), with the proviso that the glass transition temperature of component D. must be below 0° C. Pure polybutadiene rubber having an average particle diameter $d_{50}$ of 0.05 to 5 μm and preferably 0.075 to 0.6 μm is particularly preferred.

The content of D. in the molding compounds is from 0.5 to 10 parts by weight, preferably from 1 to 7.5 parts by weight and more preferably from 1.5 to 5 parts by weight, based on 100 parts by weight of A+B+C.

According to the invention, component D is used in the form of a powder mixture D, prepared from 1 to 50 and preferably 2 to 30 parts by weight of an ungrafted particulate graft base having a glass transition temperature below 0° C. and an average particle diameter $d_{50}$ of 0.05 to 5 μm in latex form and 50 to 99 parts by weight and preferably 70 to 98 parts by weight component B, component C or a mixture of B and C.

Component b. may be selected from any of the polymers obtained in latex form which were described under B. and C., more particularly SAN and ABS emulsion polymers, the quantities of b. required for the production of D* already being included in the quantities of B. and C., and the total content of D. introduced into the molding compounds through D* being within the limits mentioned above.

To prepare the powder mixture D*, components a. and b. are initially mixed with one another as latices and then worked up together to form the powder. D* by any standard method (precipitation, spray drying, etc.).

The best powder qualities D* according to the invention are obtained when the content of D (introduced in the form of the latex a.) in D* is from 2 to 30 parts by weight.

In addition, the molding compounds according to the invention may contain other known additives, such as stabilizers, pigments, mold release agents, flow aids, fillers and reinforcing materials, flameproofing agents and antistatic agents, in the usual quantities.

The molding compounds according to the invention may be prepared by mixing the constituents in known manner and melt-compounding or melt-extruding the resulting mixture at elevated temperature, preferably at 200° to 350° C., in typical units, such as internal kneaders, single-screw extruders or twin-screw extruders.

The molding compounds according to the invention may be used for the production of moldings or all kinds, for example by injection molding, extrusion or extrusion blow molding. Examples of moldings are housing parts (for example for domestic appliances, such as juice presses, coffee machines, mixers), cover panels for the building industry and, in particular, automobile parts. In addition, they are used for electrical equipment, for example for multiway connectors, because they have very good electrical properties.

Moldings can also be produced by thermoforming from prefabricated sheets or films.

Accordingly, the present invention also relates to the use of the described molding compounds for the production of moldings.

EXAMPLES

1. Components Used

Parts are parts by weight.
Component A
Linear polycarbonate based on bisphenol A having a relative solution viscosity $\eta_{rel}$ of 1.26 to 1.28, as measured in methylene chloride at 25° C. and in a concentration of 0.5 g/100 ml.

Component B
Styrene/acrylonitrile copolymer (ratio by weight of styrene to acrylonitrile 72:28) having an intrinsic viscosity [η] of 0.55 dl/g (as measured in dimethyl formamide at 20° C.).
Component C
is added through powder D* and not separately (cf. latex b.1 and b.2).

Powder Mixture D*

Latex b.1 (cf. D*1 to D*4)
SAN graft polymer of 45% by weight of a mixture of styrene and acrylonitrile (ratio by weight 72:28) on 55% by weight of a particulate polybutadiene having an average particle diameter ($d_{50}$) of 0.4 μm, obtained by emulsion polymerization with a redox activator system of cumene hydroperoxide and ascorbic acid (method according to Example B.I of DE-OS 3 738 143). The b.1 used in D*1 to D*4 is a latex stabilized with phenolic antioxidants and having a solids content of 33.3% by weight.

Latex b.2 (cf. D*5 to D*8)
SAN graft polymer of 45% by weight of a mixture of styrene and acrylonitrile (in a ratio by weight of 72:28) on 55% by weight of particulate polybutadiene having an average particle ($d_{50}$) of 0.4 μm, obtained by emulsion polymerization with potassium peroxodisulfate as activator (method according to Example B.II of DE-OS 3 738 143). The b.2 used in D*5 to D*8 is a latex stabilized with phenolic antioxidants and having a solids content of 34.5% by weight.

Latex a.
Latex of a partly crosslinked, particulate polybutadiene rubber (component D) having an average particle diameter of 0.113 μm ($d_{50}$ value) and a gel content of 97.2% by weight. Latex a. contains 36.48% by weight polymer solids.

Production of powder mixture D*
Latices a. and b.1 and a. and b.2 are stirred together for about 10 mins. at 100 r.p.m. in a 5 liter vessel in the ratios by weight shown in Table 1. The polymer solids is then precipitated at 90° C. with an aqueous solution of acetic acid (1% by weight) and magnesium sulfate (1% by weight), filtered and dried in vacuo at 70° C.

The white powder-form solids D*1 to D*8 are obtained in a yield of almost 100% (based on the quantities of solids used from a. and b.1 and a. and b.2; for compositions, see Table 1).

TABLE I

Composition of components D*1 to D*8
(parts by weight polymer solids)

| | Powder mixture | | | |
| --- | --- | --- | --- | --- |
| | D*1 Comparison | D*2 | D*3 | D*4 |
| Latex a | 0 | 4.4 | 8.9 | 27.4 |
| Latex b. 1 | 100 | 95.6 | 91.1 | 72.6 |

| | Powder mixture | | | |
| --- | --- | --- | --- | --- |
| | D*5 Comparison | D*6 | D*7 | D*8 |
| Latex a | 0 | 4.4 | 8.9 | 27.4 |
| Latex b. 2 | 100 | 95.6 | 91.1 | 72.6 |

2. Production and Testing of the Molding Compounds According to the Invention

Components A (50 parts by weight), B (20 parts by weight) and D* (30 parts by weight) were melted at 210° to 250° C. and homogenized in a 3.5 liter internal kneader (Examples 1 to 8).

Test specimens measuring 80×10×4 mm³ were injection-molded from the molding compounds (processing temperature 260° C.) and were used to determine notched impact strength at room temperature (method ISO 180 1A).

Gasoline resistance (stress cracking behavior) was measured on the 80×10×4 mm³ flat bars according to DIN 53 449/3. A mixture of 50% by weight toluene and 50% by weight isooctane was used as the simulated fuel. The test specimens were pre-extended using an arcuate template and stored in the simulated fuel for 10 minutes at 23° C. The pre-extension $\epsilon_x$ was 2.4%. Stress cracking behavior was evaluated on the basis of the cracks and fractures formed. A material has higher resistance to gasoline, the longer it can be stored in the test bath of toluene/isooctane before complete material failure (fracture) occurs.

Gloss [in %] was determined on small sample plates measuring 60×40×2 mm³ (processing temperature 260° C.) in accordance with DIN 67 530 (60°, instrument: Malinckroft Multigloss).

The properties of molding compounds according to the invention are shown in Table 2.

TABLE 2

Properties of the molding compounds
(Blend of 50 parts by weight a, 20 parts by weight B and 30 parts by weight D*)

| Molding compound of Example | Powder D* in the blend | Total content of D (pure rubber component) in the molding compound [parts by weight based on A + B + C] | Gloss in % incidence angle 60° (DIN 67 530) | Fuel resistance (DIN 53 449/3) fracture after x mins. at 2.4% pre-extension $\epsilon_R$ | Notched impact strength ISO 180 1A [kJ/m²] |
| --- | --- | --- | --- | --- | --- |
| 1 Comparison | D*1 | 0 | 95 | 12 | 45 |
| 2 | D*2 | 1.32 | 74 | 27 | 46 |
| 3 | D*3 | 2.67 | 69 | 32 | 45 |
| 4 | D*4 | 8.22 | 47 | >40 | 37 |
| 5 Comparison | D*5 | 0 | 95 | 2 | 44 |
| 6 | D*6 | 1.32 | 94 | 4 | 47 |
| 7 | D*7 | 2.67 | 78 | 8 | 45 |
| 8 | D*8 | 8.22 | 56 | 32 | 35 |

As Table 2 shows, the addition of the powder mixture D* according to the invention improves gasoline resistance and reduces gloss. Despite the presence of ungrafted polybutadiene rubber, the toughness level remains the same or is even slightly improved.

Examples 1 to 4 and 5 to 8 represent molding compounds comparable with one another (same graft polymer component in D* in 1 to 4 and in 5 to 8). Comparison Examples without D are 1 to 5. Despite the different starting levels in regard to fuel resistance and gloss where various graft polymer components are used in D* (comparison 1 and 5), an improvement in these properties is always obtained where powder compositions D* according to the invention (with ungrafted polybutadiene rubber D) are used.

We claim:

1. Thermoplastic molding compounds containing
    A. 10 to 99 parts by weight polycarbonate or polyester carbonate
    B. 0 to 90 parts by weight of a rubber-free resin compatible or partly compatible with component A.,
    C. 0 to 90 parts by weight of a rubber-modified resin compatible or partly compatible with component A.,
    D. 0.5 to 10 parts by weight, based on 100 parts by weight of A+B+C, of an ungrafted rubber component having a glass transition temperature below 0° C. which is incompatible with component A and which is a rubber consisting of butadiene, characterized in that component D is used in the form of a powder mixture D* produced from
    1 to 50 parts by weight of an ungrafted particulate rubber component having a glass transition temperature below 0° C. and an average particle diameter $d_{50}$ of 0.05 to 5 µm in latex form and which is a rubber consisting of butadiene, and
    b. 50 to 99 parts by weight of component B, component C or a mixture of components B and C in latex form, the components mentioned under a. and b. initially being mixed with one another as latices and then being worked up together to form a powder mixture D* and the total content of the quantities of rubber component D introduced into molding compounds through D*, based on 100 parts by weight A+B+C, having to be between 0.5 and 10 parts by weight and the total content of B, C or a mixture of B and C, including quantities introduced into the molding compounds through D*, not exceeding 90 parts by weight, based on 100 parts by weight A+B+C.

2. Thermoplastic molding compounds as claimed in claim 1, characterized in that component D* is prepared from a latex mixture of 2 to 30 parts by weight a. and 70 to 98 parts by weight b.

3. Thermoplastic molding compound according to claim 1, wherein component B is a copolymer of at least one monomer selected from the group consisting of aromatic vinyl compounds, vinyl cyanides, $C_{1-8}$ alkyl (meth) acrylates, unsaturated carboxylic acids and derivatives of unsaturated carboxylic acids.

4. Thermoplastic molding compounds as claimed in claim 1, characterized in that component B is a copolymer prepared from
    B.1 50 to 99 parts by weight aromatic vinyl compounds, nucleus-substituted aromatic vinyl compounds, ($C_{1-4}$) alkyl methacrylates or mixtures thereof and
    B.2 1 to 50 parts by weight vinyl cyanides, unsaturated carboxylic acids, derivatives of unsaturated carboxylic acids or mixtures thereof.

5. Thermoplastic molding compounds as claimed in claim 1, characterized in that component B is polyethyleneterephthalate, polybutyleneterephthalate or mixtures thereof.

6. Thermoplastic molding compounds as claimed in claim 1, characterized in that component C is a rubber-modified polymer prepared by graft copolymerization of C.1 10 to 95 parts by weight monomers onto C.2 5 to 90 parts by weight rubber-elastic bases.

7. Thermoplastic molding compounds as claimed in claim 6, characterized in that the monomers C.1 are mixtures of C.1.1 50 to 99 parts by weight aromatic vinyl compounds, nucleus-substituted aromatic vinyl compounds, ($C_{1-4}$) alkyl methacrylates or mixtures thereof and C.1.2 1 to 50 parts by weight vinyl cyanides, unsaturated carboxylic acids, derivatives of unsaturated carboxylic acids or mixtures thereof.

8. Thermoplastic molding compounds as claimed in claim 6, characterized in that component C.2 is a polybutadiene or acrylate rubber.

9. Thermoplastic molding compounds as claimed in claim 1, characterized in that they contain at least one additive from the group of stabilizers, pigments, mold release agents, flow aids, fillers and reinforcing materials, flameproofing agents and antistatic agents.

10. A method of using the molding compounds claimed in claim 1, wherein said molding compounds are extruded or injection molded into molded articles.

11. Thermoplastic molding compound according to claim 1, wherein component B is a mixture of a copolymer and polyethyleneterephthalate, polybutyleneterephthalate or mixtures of polyethyleneterephthalate and polybutyleneterephthalate.

12. Thermoplastic molding compounds as claimed in claim 1, characterized in that component A is a polycarbonate based on diphenols corresponding to formula (I)

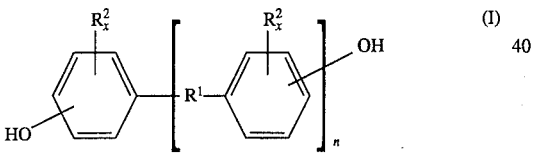

in which $R^1$ is a single bond, a $C_{1-5}$ alkylene, $C_{2-5}$ alkylidene, $C_{5-6}$ cycloalkylidene, —O—, —SO—,

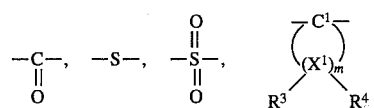

or a group corresponding to formula (II)

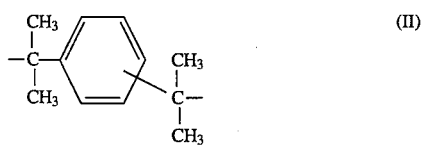

$R^2$ is chlorine or bromine, x=0, 1 or 2, n=1 or 0 and $R^3$ and $R^4$ may be individually selected for each $X^1$ and, independently of one another, represent hydrogen or $C_{1-6}$ alkyl, $X^1$ is carbon and m is an integer of 4 to 7, which may contain 1 to 25% by weight (based on the total quantity of diphenols to be used) of diphenols corresponding to formula (III)

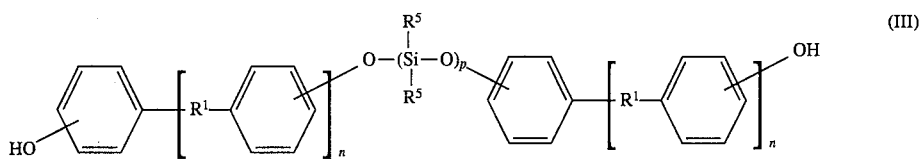

in which $R^1$ is as defined above for formula (I), n=1 or 0, the $R^5$'s may be the same or different and represent a linear $C_{1-20}$ alkyl, branched $C_{3-20}$ alkyl or $C_{6-20}$ aryl, and p is an integer of 5 to 100.

13. Thermoplastic molding compounds as claimed in claim 12, wherein p is an integer of 20 to 80.

14. Thermoplastic molding compounds as claimed in claim 12, wherein m is 4 or 5.

15. Thermoplastic molding compounds according to claim 1, wherein the ungrafted rubber component in part D. is present in an amount of 1.5 to 5 parts by weight, based on 100 parts by weight of A+B+C.

16. Amended) Thermoplastic molding compounds containing

A. 20 to 90 parts by weight polycarbonate or polyester carbonate

B. 5 to 80 parts by weight of a rubber-free resin compatible or partly compatible with component A., C. 5 to 80 parts by weight of a rubber-modified resin compatible or partly compatible with component A., D. 1 to 7.5 parts by weight, based on 100 parts by weight of A+B+C, of an ungrafted rubber component having a glass transition temperature below 0° C. which is incompatible with component A and which is a rubber consisting of butadiene, characterized in that component D is used in the form of a powder mixture D* produced from a. 1 to 50 parts by weight of an ungrafted particulate rubber component having a glass transition temperature below 0° C. and an average particle diameter $d_{50}$ of 0.05 to 5 μm in latex form and which is a rubber consisting of butadiene, and b. 50 to 99 parts by weight of component B, component C or a mixture of components B and C in latex form, the components mentioned under a. and b. initially being mixed with one another as latices and then being worked up together to form a powder mixture D* and the total content of the quantities of rubber component D introduced into molding compounds through D*, based on 100 parts by weight A+B+C, having to be between 0.5 and 10 parts by weight and the total content of B, C or a mixture of B and C, including quantities introduced into the molding compounds through D*, not exceeding 90 parts by weight, based on 100 parts by weight A+B+C.

* * * * *

UNITED STATES PATENT AND TRADEMARK OFFICE
CERTIFICATE OF CORRECTION

PATENT NO. : 5,484,846
DATED : January 16, 1996
INVENTOR(S) : WITTMAN ET AL.

It is certified that error appears in the above-indentified patent and that said Letters Patent is hereby corrected as shown below:

Column 12, line 6,--"a" should be inserted before "1 to 50 parts by weight".

Signed and Sealed this

Eighth Day of October, 1996

Attest:

BRUCE LEHMAN

Attesting Officer        Commissioner of Patents and Trademarks